(12) United States Patent
Summers et al.

(10) Patent No.: US 6,999,669 B2
(45) Date of Patent: Feb. 14, 2006

(54) PHOTONIC CRYSTALS (75) Inventors: Christopher J. Summers, Dunwoody, GA (US); Wounjhang Park, Superior, CO (US)

(73) Assignee: Georgia Tech Research Corporation, Atlanta, GA (US)

( * ) Notice: Subject to any disclaimer, the term of this patent is extended or adjusted under 35 U.S.C. 154(b) by 172 days.

(21) Appl. No.: 10/643,746

(22) Filed: Aug. 19, 2003

(65) Prior Publication Data

US 2004/0170352 A1 Sep. 2, 2004

Related U.S. Application Data

(60) Provisional application No. 60/404,504, filed on Aug. 19, 2002, provisional application No. 60/406,547, filed on Aug. 27, 2002.

(51) Int. Cl.
*G02B 6/00* (2006.01)
*G02B 5/06* (2006.01)

(52) U.S. Cl. .................. 385/131; 65/385; 385/14; 427/163.2

(58) Field of Classification Search .............. 385/37, 385/129, 131; 65/385; 427/163.2
See application file for complete search history.

(56) References Cited

U.S. PATENT DOCUMENTS

2003/0123827 A1 * 7/2003 Salerno et al. ............. 385/129
2004/0062505 A1 * 4/2004 Sugitatsu et al. ........... 385/131

* cited by examiner

*Primary Examiner*—Michelle Connelly-Cushwa
*Assistant Examiner*—James D. Stein
(74) *Attorney, Agent, or Firm*—Bockhop & Associates, LLC; Bryan W. Bockhop (57) ABSTRACT

A photonic crystal includes a phosphor matrix and a plurality of defect regions. The phosphor matrix defines a plurality of substantially spherical voids arranged in a triangular lattice arrangement. The phosphor matrix has a first index of refraction. The plurality of defect regions is distributed in a subset of the spherical voids. Each defect region has a second index of refraction that is different from the first index of refraction.

10 Claims, 4 Drawing Sheets

PHOTONIC CRYSTALS

CROSS-REFERENCE TO A RELATED PROVISIONAL PATENT APPLICATION

The present application claims priority on U.S. Provisional Patent Application Ser. Nos. 60/404,504, filed Aug. 19, 2002, and 60/406,547, filed Aug. 27, 2002, the entirety of both of which are incorporated herein by reference.

GOVERNMENT LICENSE RIGHTS

The U.S. Government has a paid-up license in this invention and the right in limited circumstances to require the patent owner to license others on reasonable terms as provided by the terms of contract no. MDA972-93-1-0030 awarded by DARPA and contract no. DAAD19-01-1-0603 awarded by the U.S. Department of the Army.

BACKGROUND OF THE INVENTION

1. Field of the Invention

The invention relates to optical systems and, more specifically, to an optical manipulation system.

2. Description of the Prior Art

Despite the rapid development and introduction of new display technologies into the market place over the last five years (plasma, EL, OLED, etc) there continues to be an ever increasing demand for higher-performance displays than those currently available. Required display attributes range from compactness and low power to sunlight read-ability and higher resolution. Because they are ubiquitous to all systems, the development of better phosphors provides a direct and economic way to significantly enhance the performance of all current display systems, and can lead to additional applications. Despite significant successes in the optimization of phosphors for new display applications, revolutionary improvements, for example, in efficiency have not been achieved. Although photonic crystals (PCs) have been shown to offer a way to dramatically improve the performance of devices such as semiconductor lasers, the application of this technology to phosphor particles themselves has not been investigated extensively because of materials limitations.

Enhancing light-matter interaction using low-dimensional photonic structures such as microcavities has received much attention for their potential to strongly enhance spontaneous emission rate and to develop thresholdless lasers. So far, research in this field has been directed to semiconductor laser structures and there has been no attempt to apply this concept to phosphors and display systems. One device addressing these issues is a photonic crystal (PC). A PC is a material with periodic dielectric constant, which modulates the electromagnetic field inside the material resulting in non-classical behavior such as the creation of a photonic bandgap, and strongly nonlinear and anisotropic dispersion. The photonic bandgap represents a region with no allowed optical modes and by providing a means to efficiently localize and confine electromagnetic field, can be used to create an optical microcavity with extremely strong light confinement resulting in very high Q factor. Quantum electrodynamics predicts that the spontaneous emission enhancement factor is proportional to the cavity Q factor and inversely proportional to the optical mode volume. A recent theoretical study predicted that a two dimensional (2D) PC microcavity can exhibit Q factors on the order of 104.2 and, it was recently reported that a 2D PC based microcavity fabricated by nanolithography exhibited very small modal volume and high Q factor ranging up to 250.3. In these structures, light is confined by the photonic band structure in the plane of the thin film, but only by the index profile in the direction perpendicular to the film. Thus, the Q values are limited by incomplete light confinement in the vertical direction, which can be overcome only by using a three-dimensional (3D) PC.

Because of their potential, there have been many theoretical studies of 3D PC opal properties. These show that the potential of 3D PCs is to provide Q-factors greater than 106, provided the correct structure is achieved. The lattice structure has a very strong influence on the realization of a photonic band gap, however currently only fcc-based lattices are experimentally realistic. In a direct fcc opal structure formed with dielectric spheres, a full photonic bandgap is not theoretically possible. Whereas in an inverse opal (fcc structure with air spheres in a dielectric material), a full photonic bandgap is possible, but only when the index of the infiltrated material exceeds 3.0. Most wide bandgap materials transparent in the visible, exhibit refractive indices much less than this: for example, the refractive index of ZnS is about 2.4. Thus, this approach requires innovations in material properties, for example, composite materials. It has been theoretically shown that a fcc structure consisting of metal-coated nano-particles exhibits a robust full 3D photonic bandgap for a wide range of frequencies and with the correct choice of metals has low absorption losses. The properties of these structures are in sharp contrast to the optical properties of regular opals, which do not exhibit any photonic bandgap even with very high dielectric constants and exhibit bandgaps only when infiltrated with high dielectric materials. Furthermore, the bandgap width may be tuned by the thickness of metal coating and this structure exhibits a full photonic bandgap even without infiltration and etching away the silica spheres, making the fabrication process much simpler. Further, it has been reported that the absorption loss of a metal photonic crystal at optical wavelengths is very small if appropriate metals such as Cu, Au or Ag are used, and there have been reported several different approaches for metal (Au, Ag, and Ni) coating spheres. Metal-coated ZnS: (Cu/Ag/Mn) nanoparticles potentially offer a route to fabricate 3D PCs. Although these material structures can have reasonably high absorption losses, because the emission is out of the plane of the phosphor, the path length is small and thus the losses to absorption are also small.

SUMMARY OF THE INVENTION

The disadvantages of the prior art are overcome by the present invention, which, in one aspect, is a photonic crystal that includes a phosphor matrix and a plurality of defect regions. The phosphor matrix defines a plurality of substantially spherical voids arranged in a triangular lattice arrangement. The phosphor matrix has a first index of refraction. The plurality of defect regions is distributed in a subset of the spherical voids. Each defect region has a second index of refraction that is different from the first index of refraction.

In another aspect, the invention is a method of making a photonic crystal in which a plurality of nano-spheres and a plurality of defect structures are forced into a triangular lattice, thereby creating a plurality of interstitial spaces. A plurality of layers of a phosphor is repeatedly applied to the plurality of nano-spheres through atomic layer deposition until the interstitial spaces are substantially filled with the phosphor. The nano-spheres are subjected to a reactant so as to remove the nano-spheres and form the photonic crystal.

In yet another aspect, the invention is a beam steering structure that includes a thin film dielectric matrix that defines a plurality of evenly spaced-apart voids therein. An optically non-linear material is disposed in each one of the voids.

In one embodiment, the invention includes microcavity phosphors based on PCs, provide an ideal platform to create microcavities.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Unless otherwise specified herein, the drawings are not necessarily drawn to scale.

Figure 1A:
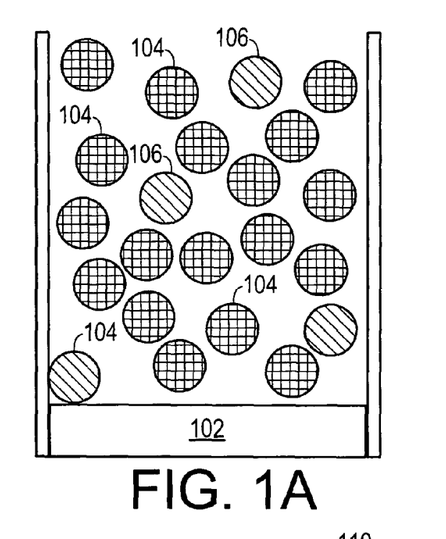
FIG. 1A is an first elevational view of a three-dimensional embodiment of the invention.
Figure 1B:
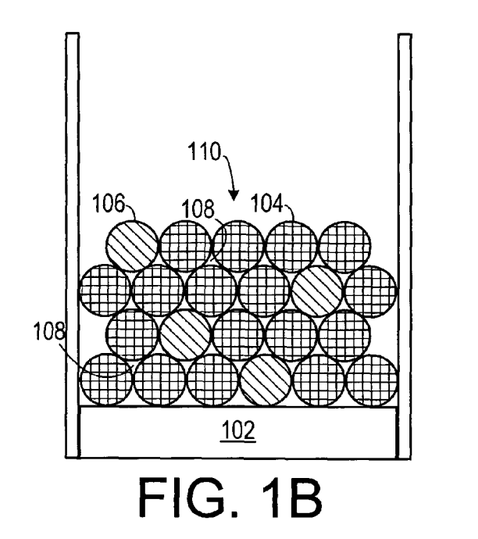
FIG. 1B is a second view of the embodiment shown in FIG. 1A.
Figure 1C:
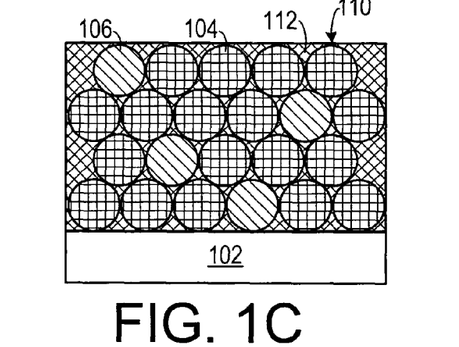
FIG. 1C is a third view of the embodiment shown in FIG. 1A

As shown in FIGS. 1A–1D, one embodiment of the invention is a three dimensional photonic phosphor crystal 130 (3D PC). One example of the formation of the photonic crystal 130 begins by placing a plurality of silica nano-spheres 104, along with a randomly-placed plurality of defect spheres 106, such as polystyrene, on a substrate 102, as shown in FIG. 1A, and forcing them into a triangular lattice structure 110 through forced sedimentation, as shown in FIG. 1B. A plurality of interstitial voids 108 are thus formed between the nano-spheres 104 and 106. As shown in FIG. 1C, through atomic layer deposition (ALD) a matrix material 112, such as a phosphor, is applied to the nano-spheres 104 and 106 in repeated layers until the interstitial voids 108 are substantially filled in. The matrix material 112 is typically a dielectric and could include a phosphor, such as ZnS or GaP. This forms a matrix 110.

Figure 1D:
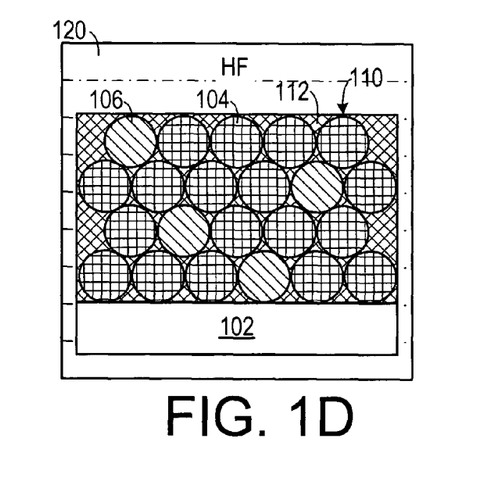
FIG. 1D is a fourth view of the embodiment shown in FIG. 1A
Figure 1E:
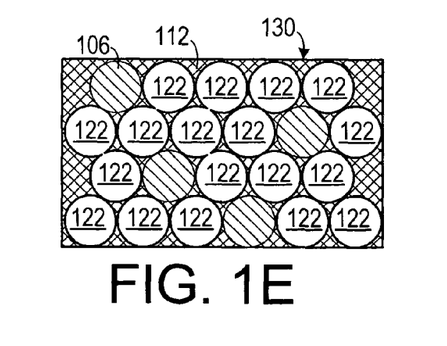
FIG. 1E is a fifth view of the embodiment shown in FIG. 1A

As shown in FIG. 1D, the matrix 110 is placed in a reactant solution 120, such as HF, which removes the silica of the silica nano-spheres 104 and the substrate 102, leaving a three-dimensional photonic crystal 130 (3D PC), that includes the matrix material 112, the defect nano-spheres 106 and a plurality of voids 122 that are essentially molds of the silica nano-spheres 104, as shown in FIG. 1E. Thus, the 3D PC 130 is an inverted opal.

The three basic mechanisms controlling the properties of a phosphor are efficient absorption of the pump excitation (electronic or photonic), the transfer of the absorbed energy to an activator, and the efficient emission of radiation from the activator of appropriate frequency. There are also always, important external restrictions on each of these processes. The pump wavelength is determined by another mechanism: the 254 nm UV-emission from the Hg discharge in fluorescent lamps, the 147 and 172 nm emission bands from the Xe-discharge in a plasma display, and the radiative emission from a light emitting or laser diode, 370–450 nm for GaInN. The absorption of the pump radiation can occur within higher energy manifolds of the activator, or within the host lattice in which case the energy must be efficiently transferred to the activator. In some phosphors this occurs directly and in other phosphors another activator (co-activator) is added to enhance the transfer of energy from the host lattice to the luminescent ion. The third requirement is that the emitted radiation must have certain functional requirements by emitting radiation of a required wavelength, linewidth and decay time.

The structure and materials of the 3D PC define the emission characteristics. The principal characteristics of a PC are the photonic band gap (PBG) in which no radiation states are allowed. Thus this region exhibits perfect reflectivity to incident, or internally generated light. These are the properties that are used to create a luminescent microcavity defect. Because overall, the total density of states is constant, the creation of a PBG suggest that there are frequency regions in which the density of states is higher than average. If this is true then the reflectivity can be reduced at certain frequencies, thus minimizing the external reflectivity and allowing more energy to enter the material and to be absorbed, by the above mention material processes. However, it is difficult to envision this process being used to significantly enhance the absorption process. Therefore, the absorption of the pump radiation must occur within the material and also the transfer of energy to the activator. The PC must therefore be made from a phosphor material that has a strong absorption band at the pump wavelength. This can be achieved either by host lattice absorption, or by absorption within an activator center. The transfer of radiation within the center, or from one center to another, must also occur very efficiently within the material. The impact of a PC must, therefore, be in controlling the emission processes and in allowing a wider range of luminescent centers to be investigated. Ideally, a broad emission band will enable the PC to be designed to produce narrow single line emissions in the red, green or blue with very high decay rates.

The invention, in one embodiment, exploits the situation for photoluminescence excitation within an inverted opal photonic crystal phosphor (IPC) designed for visible emission, when excited at frequencies higher than the photonic band gap (PBG). For this, a material with a high absorption coefficient is required. For an inverted opal the widest point is about 45 nm. For direct transition semiconductors $\alpha=10^5-10^6$ cm. Thus about 90% absorption occurs in a distance equivalent to $2/\alpha$, or in about 200–20 nm of material. Thus all of the pump radiation should be absorbed in a typical inverted PCP. The doping conditions of the phosphor are also important, as the mechanisms of energy transfer to the activator must occur within the material comprising the IPC or microcavity region. Typically the concentration of activators (Ag, Cu, Mn) in a ZnS phosphor range from approximately $10^{19}-10^{20}$ cm$^{-1}$ (about 0.02–0.2 at %.) and in an oxide phosphor from about 1–6 at %. For the lowest concentrations ($10^{19}$ cm$^{-3}$) this is equivalent to an average distance between centers of about 10 nm and for the highest concentrations (6%) of about 2.3 nm. Thus the volume of the material forming the intersects of the inverse opal is sufficiently high to contain enough activators and co-activators for the efficient transfer of energy between the activator and co-activator as occurs in a typical phosphor material. Within the microcavity region, which typically will be a sphere about 200 nm in diameter, there is obviously enough material.

For these structures, however, there is a very large surface area to volume ratio and thus a need for good surface passivation. However, even in this case, if the action of the microcavity is to dramatically enhance the radiative decay rate, the radiative decay rate can become much larger than the surface recombination rate and dominate all of the recombination processes. The important issue, therefore, is to use a phosphor with a relatively large linewidth such that the design of the microcavity-photonic crystal structure will determine the emission properties. To achieve this, the PBG of the PCP must be sufficiently wide to overlap the full width of the natural emission band of the phosphor.

A variation on this scheme is to have one material form the PC lattice and for the microcavity defect to incorporate all of the phosphor properties, absorption, energy transfer and emission, either in a one activator or two-activator system. The sole function of the surrounding PC lattice is then to determine the properties of the allowed radiation modes. It is, therefore, necessary to calculate if there is a sufficient volume of active material for efficient absorption and emission. The PC properties are maintained for sizes as small as 7–10 lattice constants, thus the microcavities must, on average, be separated by this distance in order not to interfere with its next nearest neighbor. Thus, for a "green" PC, with a lattice constant of about 140 nm, there will be one microcavity (about 140 nm in diameter) for every 343–1,000 lattice sites, in a cubic particle 1 $\mu$m on a side. This is equivalent to approximately 300 sites in a typical 7 $\mu$m diameter phosphor particle. As a first order approximation one can assume that the distribution of microcavity sites is perfectly regular. Then there will be 10 sites along each axis and a total absorption length of about 1.4 $\mu$m. Thus, the pump radiation will sample enough "microcavity absorption sites" for all the incident radiation to be absorbed by the PCP, particularly when the screen width is considered, which is typically 1.4 to 2 times the phosphor particle diameter.

For the formation of a PBG, the best structure is theoretically shown to be an inverted opal in which the infiltrated material has a refractive index greater then 3.0. Ideally, these materials should provide good host characteristics for luminescent activators. If it is possible to separate the requirements for luminescence and high index properties then it is possible to develop some schemes involving several material schemes.

The direct approach is therefore to choose materials that have these characteristics and then to incorporate them into a phosphor technology. A review of possible materials shows that, GaP has desirable physical and chemical properties, $E_G=2.25$ eV ($\lambda=552$ nm) with a refractive index that decreases from 3.6 to 3.2 over the visible region. GaP and related alloys are also highly luminescent materials and alloying with Al is expected to increase the band gap into the blue, while still maintaining a sufficiently high refractive index. Potentially, phosphors of the ZnS genre (i.e. donor-acceptor pair emission) can be developed and their emission characteristic fine-tuned by alloying with In and Al as is currently being done for LEDs. Also "localized-ion" type phosphors can be developed, as for example Mn in ZnS. GaP has been developed extensively for many new electronic and opto-electronic applications and phosphorus based compounds usually have very good surface properties.

The development of composite materials suggests possible schemes to design a material that is transparent in the visible, has a high dielectric constant and is strongly luminescent are suggested below. Currently, the closest materials with these properties is TiO$_2$ with $E_G=3.2$ eV (388 nm) whose indices between 400 and 700 nm range from 3.5 to 2.82 and from 3.0 to 2.45 for light propagating such that the E-vector is parallel to the c-axis and perpendicular to the c-axis, respectively. A 10–20% increase in index would therefore give indices greater than 3.0 and provide the required properties. The high index is due to the rutile structure in which the octagonal/triangular structure results in shared O-bonds. This effect strongly polarizes the O atom, which enhances the electronic contribution to the optical index, n. Thus, alloys which keep the rutile structure are required. This can be achieved by alloying materials with similar structural properties. The band-bowing factor could lead to a lower band gap and concomitant higher refractive index for an alloy between the two end point materials. Thus alloys of Ti/V/Zr/HfO$_2$ that retain the rutile structure maybe used.

An additional requirement is that these materials can be deposited by a technique that allows their infiltration into the (SiO$_2$) opal lattice and that they are resistant to the removal of the original opal material by etching. Thus the infiltrated material will be unaffected, and consequently will produce a periodic modulation in the refractive index that has the dimensionality to provide the PC structure and "microcavity" properties. The microcavity can be formed by incorporating a sphere of the same size as the opal material during the self-assemble process, but made of the same material as the infiltrate so that it would not be etched in the formation of the inverse opal. Or another material that would not be etched could also be used, preferable with a higher refractive index, but this is not essential. The method of infiltration could also be adjusted to fill the defect produced using a third material that can be etched, or burnt out so as to produce an empty lattice space prior to the infiltration process.

It is very complicated to fabricate 3D periodic structures using the lithographic techniques commonly used in electronics industry because it requires a series of layer-by-layer lithographic patterning, planarization and thin film deposition. In contrast, self-assembly technique by the spontaneous crystallization of nanoparticle colloids to create periodic systems, coupled with a viable infiltration technique, provides a simpler, faster and more economical way especially well suited for creating inverse 3D PCs in which the fullest effects of photonic band formation are expected.

We have therefore studied the synthesis of highly monodispersed nanoparticles and phosphors, ($SiO_2$, polystyrene, ZnS and $Y_2O_3$), with diameters between 140–450 nm, and their self-assembly into opals and the processes of opal infiltration to achieve an infiltrated structure.[4,5] Using a specially designed confinement cell for forced sedimentation, we have been able to obtain high quality opals with a large domain size, fewer defects and higher packing density as confirmed by optical characterizations which showed well-defined stop bands due to Bragg reflections. Most significantly, we have invented a new infiltration technique, which overcomes some of the limitations of previous work.

Chemical and photo-chemical techniques have the potential to realize high infiltration, but that these techniques also induce high porosity and nano-grain boundaries that, respectively, prevent realization of the full refractive index contrast expect from the bulk material characteristics, and quench their photoluminescent properties. To overcome this limitation, Atomic Layer Deposition (ALD) produces high quality infiltrated material. In one series of studies, the films were grown under conditions that would normally result in a 70 nm thick film of ZnS:Mn. The schedule included 9 repeats of a cycle that included 100 repeats of a ZnCl pulse and a $H_2S$ pulse, followed by one long MnCl/ZnCl pulse. The initial evaluations show that good infiltration was achieved and that the material has high optical quality and strong luminescent properties. These structures have been shown to be robust enough such that the silica spheres can be etched out (using HF) leaving a free standing inverse opal photonic crystal.

In one such study, the ZnS penetrated the lattice very well and that the film thickness of the spheres near the surface, was about 30 nm. The PL intensity of this film also equaled, or exceeded that from a simple layer. Similar studies have been achieved using $TiO_2$ and $Al_2O_3$.

Some examples of the structures that could result are discussed next. For example, it should be possible to coat the inside of an opal structure with a metal layer, W, Ag, Au or Cu, for example, and then follow this with the phosphor, and/or luminescent material so as to achieve an inverted metallized/phosphor PC. Additionally, layers of a ZnS:X phosphor (where, X=Ag, Cu, Tm, Mn, or Pr), or a similar phosphor material can be encapsulated within layers of $TiO_2$ and/or $Al_2O_3$, this will provide a method of passivation and additionally a means to enhance the refractive index of the composite material architecture. The inclusion of all three materials: metal, passivation oxide layer and phosphor, and the reverse sequence, and so on, can therefore, simultaneously result, in both high luminescence and a high refractive index. These composite materials will provide unique architectures for realizing a number of PC properties and can be repeated in several embodiments. For example the order of the layers can be changed and also these techniques can be applied before the formation of the opal structure as mentioned below.

Returning to the GaP material or similar materials that have a refractive index greater than 3.0. The ALD of this and similar materials can also be achieved in an atomic layer by layer approach. Thus, one can also envisage a wide range of quantum well, dots and superlattice structures that will conformably coat the inside of the opal and provide new emission characteristics for the so formed inverted PC. These can in principal be tuned for different applications.

The infiltration of a nonlinear material (LC, opto-electronic, ferro-electric) into the IPC will provide a further mechanism for the external tunability of these characteristics by either an applied electrical, optical or magnetic field. The nonlinear refractive index of these materials could also possibly be enhanced by the composite coating schemes mentioned above.

Thus ALD depositions can be used to grow high refractive index materials and phosphor materials to produce a highly conformal coverage within an opal, (the inside of the opal), so as to achieve both a high refractive index and a highly luminescent phosphor in the so formed composite material. Unique QW phosphor materials, with high indexes could also be formed as well as passivation and hermetic sealing so as to achieve high maintenance in these new structures. These same techniques can be used to coat the surfaces of the nano-particles before they self assemble, thus providing a means to produce new photonic crystal lattices and architectures.

The above assumes conformal surface coverage of the spheres forming the opal. However, if the opal is mounted on a different substrate material, and precursors are used that inhibit growth on the opal surfaces and only allow growth on the substrate, then a new variety of inverted opal PC's can be proposed. Basically the opal will be filled, bottom up, just like using water, and allow a new layered structure to be grown. This layer can also be texture in the vertical direction, giving a new dimensionality to the structure.

Doping has also been achieved by directly adding polystyrene nanoparticles to the self-assembly process. We also are working on doping using luminescent nanoparticles. The polystyrene particles will be sintered or dissolved during processing to create void spaces within the opals, which are subsequently infiltrated with luminescent materials by ALD.

To apply these concepts for practical display applications, it is important to develop technologies that are compatible with the conventional powder-based techniques used in display manufacturing processes. The holographic filter technology that involves the deposition of $MgF_2$/metal multilayer filters onto a flexible substrate, and which that is widely used for banknotes shows how this can be accomplished. After deposition the substrate is etched away and the multilayer filter is broken up into small platelets ranging from 2–20 µm in size by using an ultrasonic agitator. Since the filter thickness is typically 1 µm, the platelets align along the surface of the banknote when printed. This technology is already in wide use for US banknotes and thus well developed for mass production. Therefore, this technology can be directly extended for display manufacturing, for which the original mm or cm size phosphor-embedded 3D PCs will be broken into µm size platelets and then screen printed on display screens. One concern regarding this technique is whether the photonic crystal platelets would preserve the original photonic band structure. According to a recent publication, a 2D photonic crystal with 7 unit cells long along the propagation direction exhibited a band structure, in excellent agreement with the ab initio band calculation. Therefore, photonic crystal platelets 5–20 µm in size are expected to preserve the original band structure because the nanoparticles constituting the photonic crystals are 150–300 nm in diameter and thus the PC platelets will contain at least 10 unit cells.

An alternative approach is to use spherical opals which can be fabricated by using surface tension based self-assembly process. Typical phosphor particle sizes used in commercial display screens are of the order of 2–5 microns in diameter. Thus, by using 50 to 100 nano-spheres each 150–250 nm in diameter, it is possible to make spherical opals that are comparable in size with conventional phosphor particles and that contain microcavities infiltrated with phosphor materials. It is possible to use these phosphor-embedded PC particles in the conventional display manufacturing processes without any significant modification.

PCPs will provide brighter phosphors with fully saturated colors and fast response times than currently available. Thus they will no exhibit saturation effects that limits the performance of many current systems. There are also conformal passivation techniques that can be used to improve maintenance. They will also be suitable as direct drop-in replacements for all current display systems using glass phosphor screens, for instance, Plasma, CRT and FED Displays. Additionally there are many more applications for this technology that will lead to enhanced display properties and new schemes for up- and down-conversion, IR to visible conversion, UV to visible and spectral purity and luminescent enhancement.

For example, by making screens from PCPs it should be possible to suppress the "unwanted" infrared emission from the $Y_2O_3$:Eu phosphor at 710 nm, 630 and 650 nm, so as to enhance the intensity of the shortest red emission band at 590 and 611 nm. Additionally, higher efficiencies as well as refining the color coordinates of the red emission are possible. In fact the strongest test of this concept will be to design a photonic glass structure that will totally inhibit the red spectra, thereby promoting radiative recombination at shorter wavelengths, for example, at 530 m from the $^5D_1$-$^7F_0$ transition of $Eu^{3+}$. If these effects can be observed then it will unequivocally demonstrate the high potential of this approach to modify the optical properties of many other phosphor systems. These effects are expected to be especially pronounced in the (Y,Gd)BO$_3$:Eu phosphors currently being used in commercial PDPs because they exhibits stronger emission in the longer wavelength region (>611 nm).

Another example is ZnS:$Tm^{3+}$ which emits very strongly in the blue at 487 nm due to the $^1G_4$-$^3H_6$ transition and also in the red at 645 and 773 nm due to the transitions, $^1G_4$-$^3F_4$ and $^1G_4$-$^3H_5$, respectively. By building a photonic crystal structure using the process described above to generate a photonic band gap at the lower frequency range (longer wavelengths) the emission in the red will be suppressed and thus the optical recombination rate equations will changed in favor of the higher frequency (shorter wavelength) transition. Thus, a very efficient blue phosphor can be obtained. Additionally, by designing a structure to create a band gap at the higher frequency the opposite effect can be obtained.

This concept can also have very important applications in emission band engineering, such as to develop a totally new concept for a quantum cutter. One of the biggest problems in developing quantum cutter phosphors is the suppression of UV emission, which is in competition with the quantum cutting transition and thus limits the visible quantum efficiency. For conventional phosphors, there are very few means to selectively suppress the unwanted UV emission. However, if the quantum cutter phosphor is embedded in a photonic crystal whose optical bandgap overlaps the UV emission, then the unwanted UV emission can easily be suppressed, maximizing the visible quantum efficiency.

It is possible that by incorporating strongly polarizable or electro-optic materials in the photonic crystal structures that electrically tunable emission and steering properties can be obtained. Also optical switches and modulators properties could be incorporated into the material structure. Thus, these materials could be used to develop electronically or optically driven beam steering devices for scanning displays, and many other applications. These materials will also be combined with active luminescent materials to develop displays.

Figure 2A:
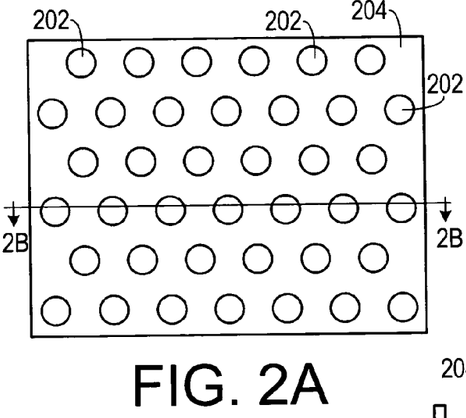
FIG. 2A is a plan view of a two-dimension embodiment of the invention.
Figure 2B:
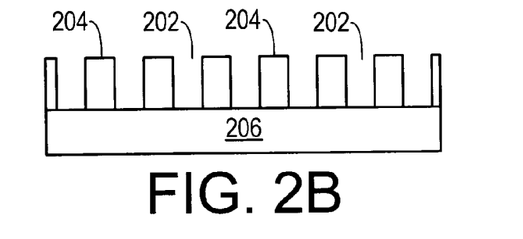
FIG. 2B is a cross-sectional view of the embodiment shown in FIG. 2A, taken along line 2B—2B.
Figure 2C:
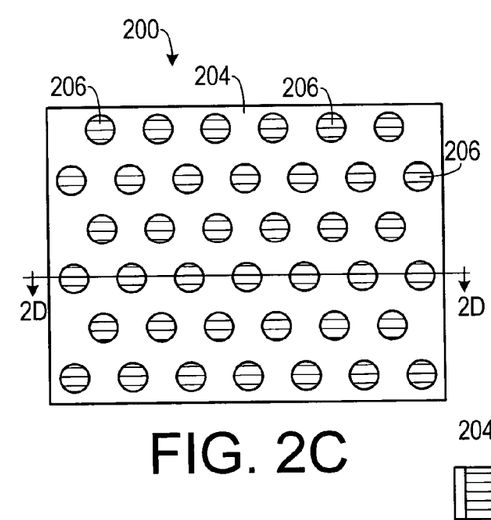
FIG. 2C is a second plan view of the embodiment shown in FIG. 2A.
Figure 2D:
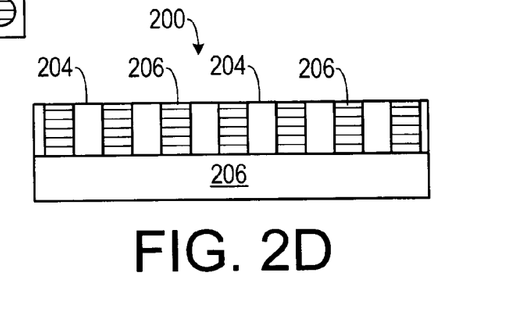
FIG. 2D is a is a cross-sectional view of the embodiment shown in FIG. 2C, taken along line 2D—2D.

In a second embodiment, as shown in FIGS. 2A–2D, the invention includes a two-dimensional (2D) optical beam steering structure 200. As shown in FIGS. 2A and 2B, the 2D structure 200 includes a thin film dielectric matrix 204 that defines a plurality of evenly spaced-apart voids 202. As shown in FIGS. 2C and 2D, the voids are infused with a material 206 that modulates optical properties. The thin film could include, for example, Si, ZnS, Ge, or GaP. Examples of materials that modulates optical properties include: an optically non-linear material, an electro-optic material and a liquid crystal, such as a nematic liquid crystal. If a liquid crystal is used it could be doped with a plurality of C-60 Fullerines or a dye.

Figures 3, 4:
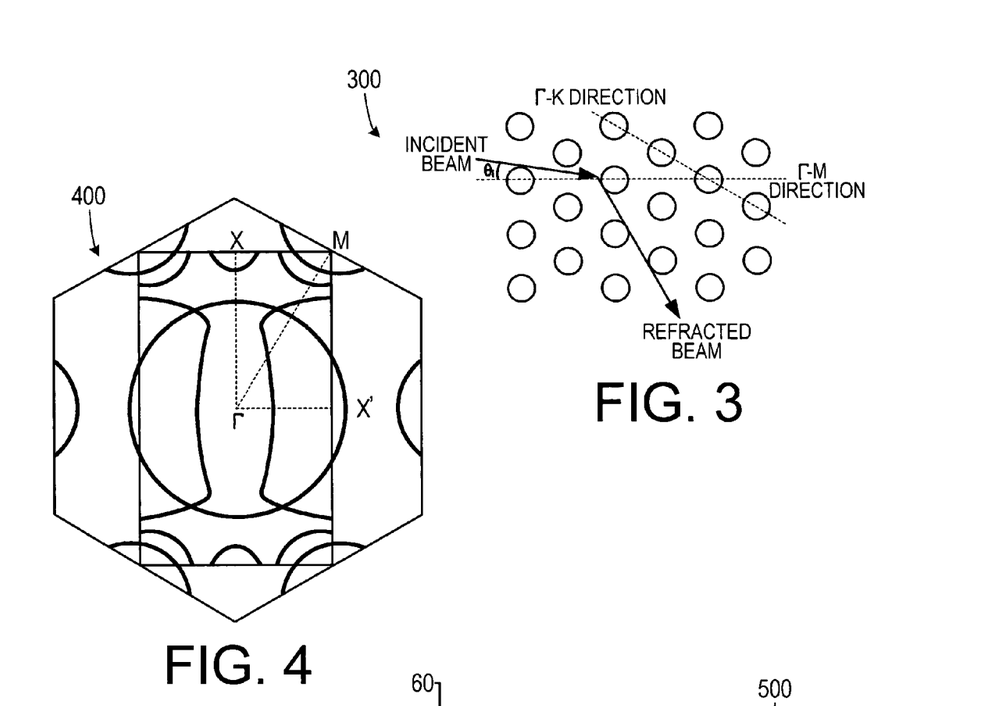
FIG. 3 shows refraction of a beam passing through one embodiment of the invention.
FIG. 4 is a dispersion diagram for one embodiment of the invention.
Figure 5:
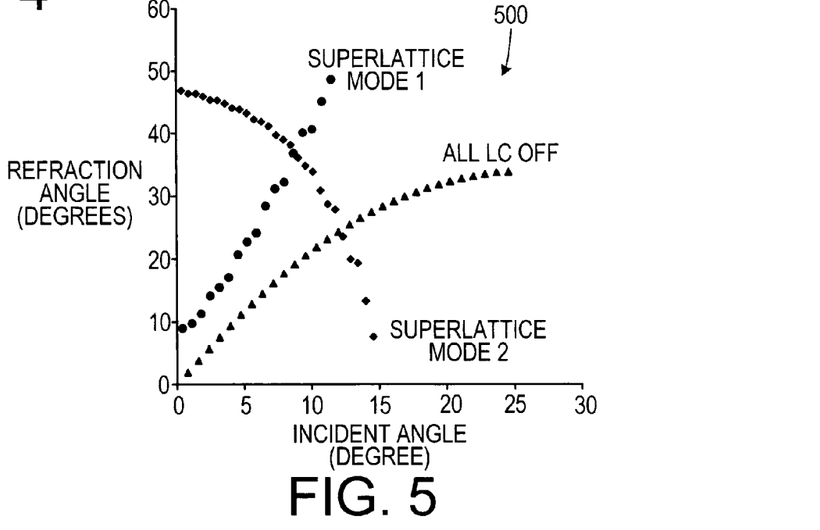
FIG. 5 is a refraction angle versus incident angle graph.

It is increasing being realized that in addition to their photonic band gap properties one of the most interesting and technologically important properties of photonic crystals (PCs) is the presence of highly nonlinear dispersion effects. This structure represents structures compatible with the conventional lithography-based fabrication techniques commonly used in the electronics industry and the self-collimation and beam steering effects in these structures have been investigated both theoretically and experimentally. As shown in FIG. 3, showing a beam passing through one embodiment of the invention 500, in a Si-based 2D slab PC, refraction angles up to 70° were predicted for incident angles less than 7°, and frequency components differing by 3% were separated by 15°. The predicted angular dispersion was much larger than what could be achieved with conventional gratings or prisms and demonstrates a unique capability to control the properties of light.

In a significant extension of this concept the applicants have recently investigated infiltrated and modulated PC structures, in which the air holes in the PC structure are filled with an optically active medium in which a large refractive index change can be induced either by electric or an optical field so as to obtain tunable effects. These materials may be conventional electro-optic materials or liquid crystals. For example, PZT is an electro-optic material in which an index change of 0.12 can be achieved and can be switched at gigahertz speeds, while liquid crystals offer much higher index changes, but are slower and subject to interface pinning in smaller structures, but are expected to be suitable for IR applications. For example, extremely large nonlinear electro- and photo-sensitive liquid crystals can be excited in the blue (488 nm) and are transparent between 400 nm and 12 $\mu$m. There is also the potential that nano-second response times can be achieved by doping. The director of the liquid crystal aligns perpendicular to the wall of the cylindrical hole. The application of an electric field across the slab therefore rotates the director parallel to the hole axis, thus changing the refractive index experienced by the TE-polarization from 1.7 to 1.5, or visa versa. Calculations of the effect of liquid crystal infiltration on giant refraction in a uniformly biased PC slab show that the incident optical beam can be scanned about 20 degrees by using high performance LCs with $\Delta n$ about 0.4.

Figure 6A:
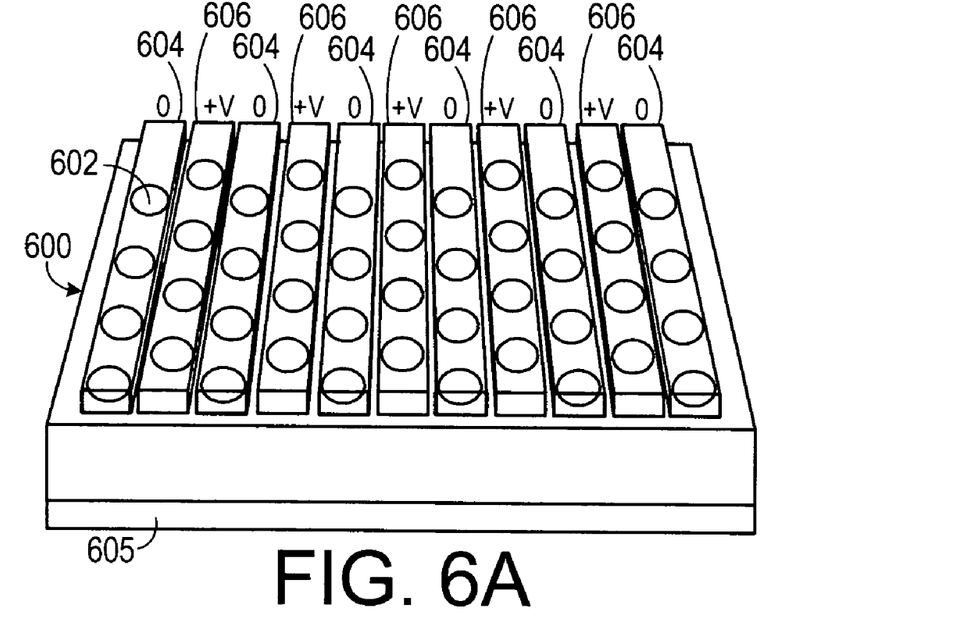
FIG. 6A is a top perspective view of one addressable lattice structure according to the invention.
Figure 6B:
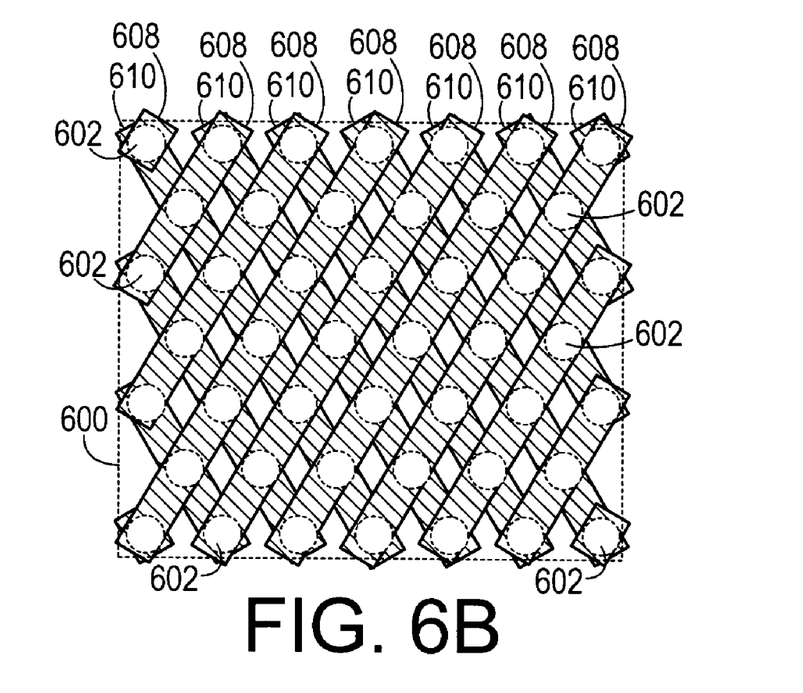
FIG. 6B is a plan view of a second addressable lattice structure according to the invention.

As shown in FIG. 6A, an additional modulation in refractive index is achieved by selectively addressing alternate rows 604 and 606 of the liquid crystal filled holes 602. This modulation creates a photonic crystal superlattice in which the additional periodicity, in addition to the index change, modifies both the reciprocal lattice space and the photonic band diagram and consequently affects the optical behavior. The simplest implementation of the device, a plurality of top electrodes 604 and 606 are linearly patterned to align along the Γ-K direction while the un-patterned bottom electrode 605 covers the entire slab PC 600. The top electrodes 604 and 606 are used to separately bias lines of holes along the Γ-K direction. When the top electrodes are biased in an alternating fashion an additional periodicity in refractive index along the Γ-M direction, thereby creating a photonic crystal superlattice. The main role of the additional periodicity is to make some of the k-vectors equivalent and thus to reduce the size of the first Brillouin zone, which is known as the Brillouin zone folding. In the superlattice structure shown, the original hexagonal Brillouin zone of the triangular PC is folded into a rectangular Brillouin zone 400, as shown in FIG. 4. Due to symmetry lowering by the additional periodicity, only 4 of the 6 original M points remain equivalent. The other two M points that are no longer equivalent to the rest are folded onto the Γ point in the new Brillouin zone. The K points are similarly affected and only two (along the vertical direction) remain as high symmetry directions. The new high symmetry points are labeled X and X'. It also shows two dispersion curves calculated at a normalized frequency ($\omega a/2\pi c$) of 0.36, the first for a triangular PC where all the holes are considered to infiltrated with a LC (diameter=0.7a) and are unbiased and the second for the superlattice created by biasing every other electrode. The two dispersion curves exhibit distinctly different shapes as a consequence of the change in refractive index and the Brillouin zone folding. Only modes outside the circle meet the guiding condition and are confined or waveguide within the slab while those inside the circle radiate into the surrounding media.

The simulations were carried out using the finite-difference time-domain (FDTD) method. The model system consists of a triangular array of circular holes filled with a nonlinear material in a thin Si slab with a thickness of 0.5a where a is the center-to-center distance between two adjacent liquid crystal filled holes. The hole diameter was set to be 0.6a. (For wavelengths of 500 nm and 5 microns this corresponds to 200 nm and 2 microns, respectively). The photonic band structures were calculated for refractive index changes of 0.1 to 0.2. The former corresponds to the change possible with PZT for a base index of 2.5 and the second for a liquid crystal, 1.5 and 1.7, respectively. These are the indices that can be obtained with and without the application of an electric or, in the case of a LC, an optical field to align the director of the infiltrated liquid crystal material. The resulting dispersion curves were then calculated for each material structure at selected frequencies.

The optical properties become critically dependent on the direction of light propagation direction. For light incident along the Γ-X' direction, the dispersion curves for the triangular PC and superlattice do not exhibit a significant change in their curvatures and thus the refraction properties are similar to the case of uniform biasing as reported elsewhere. However, there is a major difference in that the Brillouin zone folding transfers the originally guided modes of a triangular PC into the radiation regime in the superlattice. Thus, along the Γ-X' direction, one achieves switching between guided and radiation modes for modest changes in refraction angles. On the other hand, along the Γ-X direction, which corresponds to light propagating parallel to the top electrode, the triangular PC with all electrodes unbiased exhibits a stop band and thus does not support any modes. However, when the electrodes are switched on in an alternating manner to create a superlattice PC, the Brillouin zone folding brings in allowed modes along the Γ-X direction. Thus, along the Γ-X direction, one may switch between two states where light is allowed to propagate with modest refraction or all of the incident light is back reflected. A more complicated behavior is expected along the equivalent Γ-M directions, which make an angle of 30° with the top electrodes. As shown in FIG. 3, a refraction versus incident angle graph 300, the superlattice possesses 3 allowed modes along the Γ-M direction but only two are guided modes lying outside the cut-off circle. The outermost mode (mode 1) exhibits a curvature similar to that of the triangular PC. Thus, for this branch, we expect only modest changes in the refraction angle. The outermost branch exhibits about 10° changes in refraction angle for very small incident angles ($\theta_i<2°$) and almost 50° refraction for $\theta_i=12°$ beyond which the mode ceases to exist. The other guided mode (mode 2) exhibits a fundamentally different curvature. At small incident angles, the refraction angle has its maximum of 47° and decreases with increasing incident angle. This behavior is completely opposite to the triangular PC, which exhibits small refraction effects at low incident angles. Therefore, by preferentially coupling to this branch, light incident along the Γ-M direction may be electronically, or optically, scanned over very large angles: up to 47°, by changing the refractive index from 1.5 to 1.7. Furthermore, for incident angles greater than 12°, the outermost branch no longer exists, resulting in a single-mode regime where the superlattice exhibits smaller refraction angles than the triangular PC. In this single-mode operation, the largest difference in refraction angle was approximately 20° at an incident angle of 15°.

In recent years, it is increasingly being realized that in addition to their photonic band gap (PBG) properties one of the most interesting and technologically important properties of PCs is the presence of highly nonlinear and anisotropic dispersion. For a Si-based 2D slab PC, refraction angles up to 70° were predicted for incident angles less than 7°, and frequency components differing only by 3% were separated by 15°. The predicted angular dispersion was much larger than what could be achieved with conventional gratings or prisms and demonstrates a unique capability to control the propagation of light. Also, the 2D slab PC represents far more realistic structures compatible with the conventional lithography-based fabrication techniques commonly used in the electronics industry. The self-collimation effect in these structures has also been investigated theoretically.

There are considerable advantages in being able to tune these effects. The PBG can be tuned using the temperature dependence of the refractive index of a liquid crystal (LC) that was infiltrated into a silica opal and a 12 $\mu$m thick porous Si PC with 1.58 $\mu$m pitch, respectively. The LC mechanism is an escaped-radial alignment of the director, and showed that consequently the tunability was approximately 60% of the full index change.

The applicants have carried out a theoretical investigation on infiltrated and modulated PC structures realized by filling the air holes in the PC structure with an optically active medium in which a large refractive index change can be induced either by an electric or optical field, resulting in tunable effects. These materials may be conventional electro-optic materials or liquid crystal (LC). For example, lead lanthanum zirconate titanate (PLZT) is an electro-optic material in which an index change of 0.12 can be achieved and can be switched at gigahertz speeds. LCs offer much higher index changes (up to $\Delta n >0.4$) and, although slower and subject to interface pinning in smaller structures, are expected to be suitable for IR applications. Additionally, LCs can exhibit an extremely large photo-sensitive nonlinearity when excited in the blue (488 nm) and are transparent between 400 nm and 12 µm. There is also the potential that nanosecond response times can be achieved by doping. The director of the LC molecules aligns perpendicular to the wall of the cylindrical hole. The application of an electric field across the liquid crystal filled slab, therefore, rotates the director parallel to the hole axis, thus changing the refractive index experienced by the TE-polarized light from 1.7 to 1.5, or visa versa. The model structure has a rather high aspect ratio of LC-filled hole diameter to waveguide thickness, about 1.5, thus the effect of electric field modulation can be fairly high. Additionally, the development of highly birefringent LCs with $\Delta n > 0.4$ strongly suggests that these effects can be demonstrated experimentally, even if the geometry limits the full index change.

The simulations were carried out using the finite-difference time-domain (FDTD) method. This study explicitly incorporated the effect of finite thickness of the slab PC structure and thus took fully into account the constraints imposed by the guiding conditions. The model system consists of a triangular array of circular holes filled with an electro-optic material in a thin Si slab. The hole diameter was set to be 0.7a and the slab thickness 0.5a where a is the center-to-center distance between two adjacent holes. For operating wavelengths of 500 nm and 1.55 µm, this corresponds to 180 and 560 nm, respectively. The photonic band structures were calculated for refractive index changes between 1.5 and 1.7. It is noted that similar results were also obtained for systems with lower $\Delta n$ values, which could significantly alleviate material requirements.

The simulations on LC infiltrated 2D slab PC structures indicated that, with an LC index change of $\Delta n = 0.2$, the incident optical beams could be steered over about 5 degrees, which was much smaller than what were predicted by pure 2D modeling studies. When a high performance LC with $\Delta n = 0.4$ was used, the range of steering angle could be increased to over 20 degrees. However, the effect of dynamic changes in refractive index can be dramatically increased by selectively biasing the optically active material so that the PC structure can be transformed into a superlattice structure. Besides the refractive index modulation by the triangularly periodic holes patterned in a dielectric slab, an additional modulation is achieved by selectively addressing alternate rows of the LC-filled holes. This modulation creates a superlattice PC in which the additional periodicity superimposed by the index change modifies both the reciprocal lattice space and consequently the photonic band diagram with profound effects on the optical behavior.

A refraction angle versus Incident angle graph 300 for different superlattice modes is shown in FIG. 3. In the 2D superlattice PC that is shown to have unique directional properties, electro-optic materials are incorporated into a slab PC structure so that an external field can not only change the refractive index values but also create an additional periodicity in the waveguide structure. The resulting superlattice structure exhibits light propagations extremely sensitive to the refractive index changes because of the Brillouin zone folding effect. Using a simple biasing scheme in which alternating electrodes along the Γ-K direction are switched on and off, one may achieve switching, out-coupling and beam steering over a wide range of angles. For an index change of $\Delta n = 0.2$, light traveling parallel to the superlattice modulation can be switched on/off, and in a direction perpendicular to it can be switched from the guided state to being out-coupled. For propagation at an angle of 30° to the modulating electrodes, a large variation in refraction angles up to 47° was achieved. The proposed scheme of simultaneously controlling refractive index values and their periodicity enables dramatic changes in the optical properties of PCs with only modest changes in refractive index values. The demonstration of dynamically controllable giant refraction with a wide range of tunability creates a new tool to manipulate light propagation through PCs and opens possibilities of realizing, among others, optical switches, routers or modulators in a compact, highly-integrated design. In one embodiment, the invention could take the form of a Multi periodic 3D structure that employs multiple layers of the type described above.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A method of making a photonic crystal, comprising the steps of:
   a. forcing a plurality of nano-structures and a plurality of defect structures into a lattice, thereby creating a plurality of interstitial spaces;
   b. repeatedly applying, through atomic layer deposition, a plurality of layers of a predetermined optical material to the plurality of nano-structures until the interstitial spaces are substantially filled with phosphor; and
   c. subjecting the nano-structures to a reactant so as to remove the nano-structure and form the photonic crystal.

2. The method of claim 1, wherein the nano-structures comprise Si.

3. The method of claim 1, wherein the nano-structures comprise nano-spheres.

4. The method of claim 1, wherein the predetermined optical material comprises a phosphor.

5. The method of claim 4, wherein the phosphor comprises ZnS.

6. The method of claim 1, wherein the predetermined optical material comprises a high index material.

7. The method of claim 1, wherein the predetermined optical material comprises a luminescent material.

8. The method of claim 1, wherein the predetermined optical material comprises a plurality of layers, each layer selected from the group consisting of: a phosphor, a high index material, and a luminescent material.

9. The method of claim 1, wherein the reactant comprises HF.

10. The method of claim 1, wherein the reactant comprises an organic solvent.

* * * * *